Patented Nov. 4, 1941

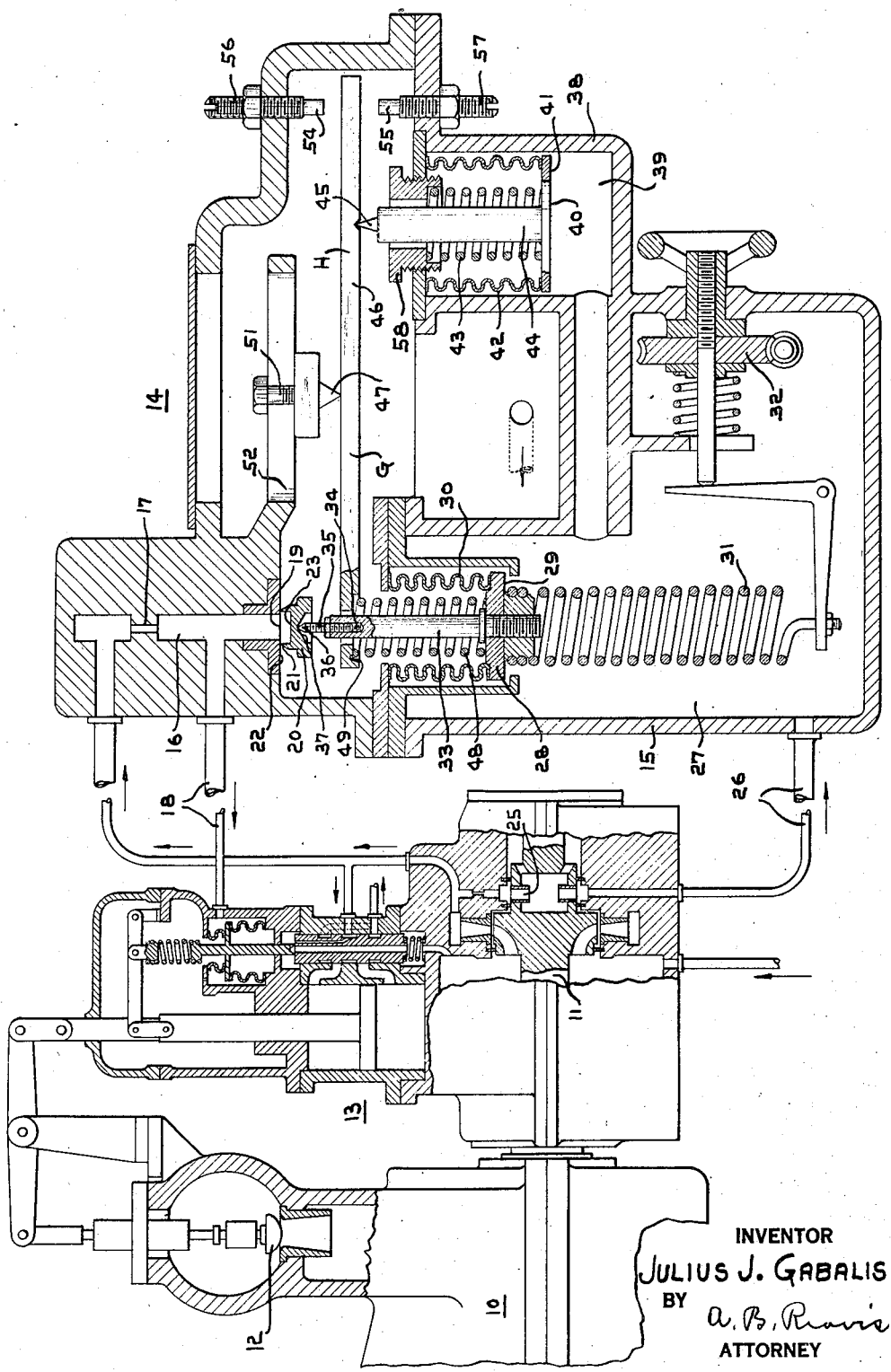

2,261,462

UNITED STATES PATENT OFFICE 2,261,462

GOVERNING APPARATUS

Julius J. Gabalis, Philadelphia, Pa., assignor to Westinghouse Electric & Manufacturing Company, East Pittsburgh, Pa., a corporation of Pennsylvania Application February 1, 1941, Serial No. 376,975

17 Claims. (Cl. 264—3)

The invention relates to governing mechanism and it has for an object to provide apparatus of this character with means effective over a desired portion of the speed range from no load to full load to adjust the regulation to a desired extent.

A further object of the invention is to provide apparatus operating in conjunction with a speed governor to obtain various predetermined rates of regulation of the latter in predetermined speed ranges.

It is often desirable to operate a governor with various rates of regulation in definite speed ranges. For example, a speed governor used on an elastic-fluid turbine may be so arranged that the inlet valve goes from full load to no load position with a speed change of 4% of the normal speed. This may be said to be the normal regulation rate of the governor. If the normal turbine speed were 3600 R. P. M. it would require a speed change of 144 R. P. M. to cause the governor valve to move through full range, that is, the governor valve would move 1/144 of the total travel for each R. P. M. speed change. However, it is often desirable to operate a turbine so that, within a certain speed range of say 3580 to 3620 R. P. M., the governor valve will move at a rate of say 1/288 of its travel per R. P. M. or at the rate of regulation of 8%, or, for an extreme case, not to move at all in this speed range. Above and below the speed range chosen, it is usually preferred again to have the normal rate of regulation of say 4%, or whatever value was chosen as the normal.

Apparatus to broaden the regulation of governors in central station practice is desirable. With a base load turbine, it is highly undesirable that the load follow system speed changes. A partial solution of this problem has been afforded by a load limit device which permits the governor to open the valve only a predetermined amount in case of decrease in speed but which does not interfere with the governor closing the valve in case of increase in speed. The load limit devices suffers the disadvantage that, should a rapid demand for load that cannot be supplied by other turbines be encountered, the device must be released by hand. This is particularly objectionable with "topping" turbines where a load limit device is used to obtain steady normal operation but which results in the inability to increase load when speed drops an abnormal amount.

Regulation of turbine load to suit line loads also provides a need for a device of the present character. In an effort to keep the line load at a certain value, electrical means are used on the speed changer to regulate the load. In addition to the governor, attempts to regulate load with frequency are often at cross purposes with the line control. The speed-responsive elements cannot be cut out, since, with a loss of the tie line, there would be no speed control. The present device permits of a constant load within a fixed frequency band; and, if this frequency band is exceeded, normal governing occurs without attention on the part of the operator.

A further use for the present invention is to permit a relatively wide regulation range without the possibility of exceeding the normal tripping speed in case of load dump. For example, the normal regulation of a governor may not exceed 10%, since the unit will overspeed if full load is lost. If, however, the regulation is set at 10, 15 or 20%, with a range up to say 1% above normal, then, 2% above this range, the governor is in effect a 3% governor so far as load dump is concerned rather than a 10% governor as set in a normal frequency range.

The foregoing and other objects are effected by the invention as will be apparent from the following description and claims taken in connection with the accompanying drawing forming a part of this application, in which the figure is a diagrammatic view of a prime mover and its governor showing the means for adjusting the regulation of the latter.

Referring to the drawing more in detail, the turbine, at 10, has a spindle or rotor 11 and an admission valve 12. The admission valve is controlled by a servo-motor 13 operated by means of governing apparatus, at 14.

Preferably, the servo-motor 13 operates in response to changes in regulating or transformed fluid pressure supplied thereto from the governing apparatus, at 14, of the transformer type.

The transformer governor, at 14, includes structure 15 providing the transformed fluid pressure space 16 to which fluid from any suitable source is supplied by means of the metering orifice 17. The space 16 communicates with the passage or conduit 18 for supplying fluid under transformed or regulating pressure to the pressure-responsive servo-motor 13 and it has an escape or spill opening 19. A cup 20 covers the opening 19 and it has an edge 21 cooperating with the seat 22 to define an annular escape orifice bounding the area 23 subject to transformed or regulating pressure.

Force dependent upon turbine speed is applied to the cup valve, the latter normally occupying a position with the upward and downward forces acting thereon in equilibrium and providing for the maintenance of a transformed or regulating pressure dependent upon load so long as the latter does not change; however, as the load changes, the speed changes and the cup valve comes to a new equilibrium position for the new load at a speed which differs from the original dependent upon the extent of load change. For example, from no load to full load, the speed change may be about 4%, this being known as the regulating range or percentage. As already pointed out, it may be desirable to have the governor operate with a very much wider regulation over a predetermined speed or load range. Accordingly, therefore, apparatus is provided to operate in conjunction with the governor to achieve this effect. Such apparatus includes any suitable means operative in response to the speed-responsive force to oppose the action of the latter on the transformer over a given speed or load range with the result that the regulation is broadened to the extent of and as long as this opposition is effective.

Preferably, the force responsive to speed and applied to the cup valve 20 is provided by the impeller 25 driven by the turbine rotor 11 and providing fluid under primary pressure varying substantially as the square of the speed, the fluid under primary pressure being supplied by the conduit or passage 26 to the expansible chamber 27 of the transformer governor, at 14. An abutment 28 has a pressure area 29 exposed to the interior of the chamber 27, the abutment being connected to the body structure 15 by means of a bellows 30. A load spring 31 exerts force on the abutment opposing that of primary fluid pressure and its force may be changed or adjusted by the speed changer mechanism, at 32.

The abutment 28 has a stem 33 connected by threads 34 to the pivot pin 35 whose upper pivot end 36 engages in the pivot cavity 37 formed in the cup valve 20.

With the arrangement so far described, it will be apparent that the governor operates with a normal percentage of regulation from no load to full load and that the speed changer 32 may be operated in the usual way to change the speed setting incident to synchronizing a machine and to adjustment thereof so as to cause it to carry more or less load at a given speed.

Referring now to the supplementary apparatus providing for broadened regulation over a desired portion of the total speed range, in the drawings, there is shown a housing or body structure 38 providing an expansible chamber 39 to which the pressure area 40 of the abutment 41 is exposed, the abutment being connected to the body structure 38 by means of a bellows 42.

Fluid under primary pressure is supplied by the conduit or passage 26 to the expansible chamber 39 and the force thereof acting on the pressure area 40 is opposed by that of the spring 43.

The abutment 41 has a stem 44 having a pivotal connection 45 with respect to the lever 46 movable about the fulcrum 47 to vary or modify the force of the spring 48 exerted on the abutment 28 in opposition to that of fluid pressure applied to the area 29. Preferably, the lower end of the spring 48 engages the abutment 28 and its upper end is engaged by the abutment 49 formed at one end of the lever 46.

With a change in load, the primary fluid pressure changes and such fluid pressure is supplied both to the expansible chambers 27 and 39 for action on the pressure areas 29 and 40. If the lever 46 is free to move and the fulcrum 47 is disposed between the lines of action of the abutments 41 and 28, then the force transmitted by the lever 46 and the spring 48 will be in opposition to that applied to the pressure area 29, thus opposing or neutralizing primary fluid pressure force change due to load change with the result that the regulation is broadened to the extent of the force transmitted.

The fulcrum 47 is preferably adjustable by means of screw 51 engaging the slot 52. The force applied by the lever to the spring 48 depends upon the ratio of the lever arm G from the line of action of the abutment 28 to the fulcrum 47 to the lever arm H from the fulcrum to the line of action of the abutment 41. By adjustment of the fulcrum, these lever arms may be relatively varied to change the force transmitted from the abutment 41 to the abutment 28. If the fulcrum is adjusted to be in the line of action of the abutment 41, then no force will be transmitted; however, as the fulcrum is adjusted inward, more and more force will be transmitted to the spring until, at the inner end of the slot, the maximum force is transmitted.

In order that the opposing effect of the spring 48 to broaden the regulation may be restricted to a desired portion of the total speed range, spaced stops 54 and 55 cooperate with the lever 46 to limit the extent of angular motion thereof about the fulcrum 47. With a decrease in load and increase in primary pressure, the lever is moved counter-clockwise about the fulcrum 47 to oppose the effect of increased primary pressure applied to the abutment 28 until the lever engages the upper stop 54, the latter stop fixing the upper speed range at which regulation returns to normal. In the same manner, the lower stop 55 fixes the lower portion of the speed range at which the governor returns to normal. During this range of movement of the lever 46 between the stops 54 and 55, changes in primary pressure acting on the pressure area 29 will be opposed or compensated to provide for broadened regulation.

The stops 54 and 55 are shown as being adjustable, they having screws 56 and 57, respectively, for this purpose. In order that the mid-point of the speed range between the stops may be adjusted, the spring 43 is engaged by a threaded abutment 58 adjustable to vary the force of the spring.

While the invention has been shown in but one form, it will be obvious to those skilled in the art that it is not so limited, but is susceptible of various changes and modifications without departing from the spirit thereof, and it is desired, therefore, that only such limitations shall be placed thereupon as are specifically set forth in the appended claims.

What is claimed is:

1. The combination with governing apparatus for a prime mover and including force-responsive means and means providing and applying to the latter force dependent upon prime mover speed, of means responsive to speed of the prime mover to oppose the effect of said force on the force-responsive means, and means for rendering the last-named means ineffective below a predetermined minimum prime mover load and above a predetermined maximum prime mover load.

2. The combination with governing apparatus for controlling the admission of motive fluid to a prime mover and including force-responsive means and means providing and applying to the latter force dependent upon prime mover speed, of means effective from a minimum load to a maximum load within the total load range of the prime mover and responsive to speed of the latter to oppose the effect of said force on the force-responsive means, and means for varying the magnitude of said opposition.

3. The combination with governing apparatus for controlling the admission of motive fluid to a prime mover and including force-responsive means and means providing and applying to the latter force dependent upon prime mover speed, of means effective from a minimum load to a maximum load within the total load range of the prime mover and responsive to speed of the latter to oppose the effect of said force on the force-responsive means, means for varying the magnitude of said opposition, and means providing for adjustment of said minimum and maximum load limits.

4. The combination with governing apparatus for a prime mover including a force-responsive element and means providing and applying to the element force dependent upon prime mover speed, of a spring having one end abutting said element so that its force may oppose the speed-responsive force, an abutment for the other end of the spring, a member having force applied thereto dependent upon prime mover speed, means for transmitting force from the member to the abutment, and means for rendering the transmitting means ineffective below a predetermined minimum prime mover speed and above a predetermined maximum prime mover speed.

5. The combination with governing apparatus for a prime mover including a force-responsive element and means providing and applying to the element force dependent upon prime mover speed, of a spring having one end abutting said element so that its force may oppose the speed-responsive force, an abutment for the other end of the spring, a member having force applied thereto dependent upon prime mover speed, means for transmitting force from the member to the abutment, means for rendering the transmitting means ineffective below a predetermined minimum prime mover speed and above a predetermined maximum prime mover speed, and means for adjusting the transmitting means to vary the transmitted force.

6. The combination with hydraulic governing apparatus for a prime mover and including means providing a force dependent upon prime mover speed and a transformer for transforming changes in said force into changes in transformed or regulating pressure used to control the admission of motive fluid to the prime mover, said transformer including a first member to which said force is applied: of a second member to which said force is applied, means for transmitting force from the second member to the first member so that changes therein are opposed to changes in the first force applied to the latter, and means for restricting the effectiveness of the transmitting means to a speed range less than the total speed range from no load to full load of the prime mover.

7. The combination with hydraulic governing apparatus for a prime mover and including means providing a force dependent upon prime mover speed and a transformer for transforming changes in said force into changes in transformed or regulating pressure used to control the admission of motive fluid to the prime mover, said transformer including a first member to which said force is applied: of a second member to which said force is applied, means for transmitting force from the second member to the first member so that changes therein are in opposed relation to changes in the first force applied to the latter member, means for restricting the effectiveness of the transmitting means to a speed range less than the total speed range from no load to full load of the prime mover, and means providing for variation of the force transmitted by the transmitting means.

8. The combination with hydraulic governing apparatus for a prime mover and including means providing a force dependent upon prime mover speed and a transformer for transforming changes in said force into changes in transformed or regulating pressure used to control the admission of motive fluid to the prime mover, said transformer including a first member to which said force is applied: of a second member to which said force is applied, a lever pivotally connected to the second member, a spring interposed between the lever and the first member so that it may exert force on the latter in opposition to said first force, a fulcrum for the lever, and stops for limiting the range of movement of the lever about the fulcrum.

9. The combination with hydraulic governing apparatus for a prime mover and including means providing a force dependent upon prime mover speed and a transformer for transforming changes in said force into changes in transformed or regulating pressure used to control the admission of motive fluid to the prime mover, said transformer including a first member to which said force is applied: of a second member to which said force is applied; a lever pivotally connected to the second member; a spring interposed between the lever and the first member so that it may exert force on the latter in opposition to said first force; a fulcrum for the lever; stops for limiting the range or movement of the lever about the fulcrum; and mechanism for centering the lever between the stops and including a spring exerting its force on the second member in opposition to the first force applied thereto and means for adjusting the force of the spring.

10. The combination with hydraulic governing apparatus for a prime mover and including means providing a force dependent upon prime mover speed and a transformer for transforming changes in said force into changes in transformed or regulating pressure used to control the admission of motive fluid to the prime mover, said transformer including a first member to which said force is applied: of a second member to which said force is applied, a lever pivotally connected to the second member, a spring interposed between the lever and the first member so that it may exert force on the latter in opposition to said first force, a fulcrum for the lever, stops for limiting the range of movement of the lever about the fulcrum, and means for adjusting the fulcrum from a position in the line of action of the second member inwardly toward the line of action of the first member.

11. The combination with hydraulic governing apparatus for a prime mover, said apparatus comprising means for developing fluid under primary pressure dependent upon prime mover speed and a transformer including a movable abutment subject to said pressure to provide a transformed fluid pressure for controlling the prime mover, of a spring having one end engaging the abutment at the side of the latter opposite to that to which fluid pressure is applied, a lever having one end abutting the other end of the spring, stops for limiting the extent of movement of the other end of the lever, a fulcrum for the lever, and means for moving the lever about the fulcrum including a second movable abutment subject to primary fluid pressure.

12. The combination with hydraulic governing apparatus for a prime mover, said governing apparatus comprising means providing fluid under primary pressure dependent upon prime mover speed and a transformer for transforming changes in primary pressure into changes in transformed fluid pressure, and means utilizing the transformed fluid pressure to control the prime mover, said transformer including an expansible chamber supplied with fluid under primary pressure and to which is exposed the pressure area of a pressure abutment, of a spring having one end engaging the side of said abutment opposite to its pressure area, means providing a second expansible chamber and including a second movable abutment presenting a pressure area thereto, a lever engaging the other end of said spring and said second abutment, a fulcrum for the lever, and stops for limiting the extent of movement of the lever about the fulcrum.

13. The combination with hydraulic governing apparatus for a prime mover and including means for developing fluid under primary pressure dependent upon the prime mover speed and a transformer for transforming changes in primary pressure into changes in transformed or regulating pressure used to control the admission of motive to the prime mover, said transformer including a movable abutment having a pressure area subject to fluid under primary pressure; of a second movable abutment having a pressure area subject to fluid under primary pressure, means for transmitting force from the second abutment to the first abutment so that changes therein are in opposed relation with respect to changes in the force of primary pressure acting on the first abutment, and means for restricting the effectiveness of the last-named means to a speed range less than the total speed range from no load to full load of the prime mover.

14. The combination with hydraulic governing apparatus for a prime mover and including means for developing fluid under primary pressure dependent upon the prime mover speed and a transformer for transforming changes in primary pressure into changes in transformed or regulating pressure used to control the admission of motive fluid to the prime mover, said transformer including a movable abutment having a pressure area subject to fluid under primary pressure; of a second movable abutment having a pressure area subject to fluid under primary pressure, means for transmitting force from the second abutment to the first abutment so that changes therein are in opposed relation with respect to changes in the force of primary pressure acting on the first abutment, means for restricting the effectiveness of the last-named means to a speed range less than the total speed range from no load to full load of the prime mover, and means providing for adjustment of the force transmitted by the transmitting means.

15. The combination with hydraulic governing apparatus for a prime mover and including means for developing fluid under primary pressure dependent upon the prime mover speed and a transformer for transforming changes in primary pressure into changes in transformed or regulating pressure used to control the admission of motive fluid to the prime mover, said transformer including a movable abutment having a pressure area subject to fluid under primary pressure: of a second movable abutment having a pressure area subject to fluid under primary pressure, means for transmitting force from the second abutment to the first abutment so that changes in said force are in opposed relation to changes in force of the primary pressure acting on the first abutment and including a lever pivotally connected to the second abutment, a spring interposed between the lever and the first abutment, a fulcrum for the lever, and stops for limiting movement of the lever.

16. The combination with hydraulic governing apparatus for a prime mover and including means for developing fluid under primary pressure dependent upon the prime mover speed and a transformer for transforming changes in primary pressure into changes in transformed or regulating pressure used to control the admission of motive fluid to the prime mover, said transformer including a movable abutment having a pressure area subject to fluid under primary pressure: of a second movable abutment having a pressure area subject to fluid under primary pressure, means for transmitting force from the second abutment to the first abutment so that changes in said force are in opposed relation to changes in force of the primary pressure acting on the first abutment and including a lever pivotally connected to the second abutment, a spring interposed between the lever and the first abutment, a fulcrum for the lever, stops for limiting movement of the lever, and means for adjusting the fulcrum from a position in the line of action of the second abutment inwardly toward the line of action of the first abutment.

17. The combination with hydraulic governing apparatus for a prime mover and including means for developing fluid under primary pressure dependent upon the prime mover speed and a transformer for transforming changes in primary pressure into changes in transformed or regulating pressure used to control the admission of motive fluid to the prime mover, said transformer including a movable abutment having a pressure area subject to fluid under primary pressure: of a second movable abutment having a pressure area subject to fluid under primary pressure, means for transmitting force from the second abutment to the first abutment so that changes in said force are in opposed relation to changes in force of the primary pressure acting on the first abutment and including a lever pivotally connected to the second abutment, a spring interposed between the lever and the first abutment, a fulcrum for the lever, stops for limiting movement of the lever, and mechanism for centering the lever between the stops and including a spring exerting its force on the second abutment in opposition to that of primary pressure applied thereto and means for adjusting the force of the spring.

JULIUS J. GABALIS.